United States Patent Office 3,378,513
Patented Apr. 16, 1968

3,378,513
COPOLYMERS OF VINYL TOLUENE, ISOMERIC BUTYL METHACRYLATES AND LONG CHAIN ALKYL METHACRYLATES
Daniel B. Witwer, Lynn, Mass., assignor to Polyvinyl Chemicals, Inc., Peabody, Mass., a corporation of Massachusetts
No Drawing. Filed May 31, 1966, Ser. No. 553,730
5 Claims. (Cl. 260—33.6)

ABSTRACT OF THE DISCLOSURE

Film forming agents and polishing compositions consisting of solutions of the agents in a hydrocarbon solvent. The film forming agents are hydrocarbon soluble terpolymers of vinyl toluene, i-butyl methacrylate, and lauryl or stearyl methacrylate. The full specification should be consulted for an understanding of the invention.

My invention relates to polymeric resins, and particularly to novel terpolymers of vinyl toluene, isomeric butyl methacrylates and long chain alkyl methacrylates that are especially useful as film-forming agents in polishing compositions.

Natural waxes of varying degrees of hardness have long been used in polishing compositions for furniture, flooring, counter tops and the like to produce decorative and protective waterproof coatings that can be polished to a desirable gloss. The coatings produced by such waxes are healable, in that marks formed by scuffing or other abrasions can be removed by buffing the coated surface. However, the natural waxes have a number of disadvantages. In general, a natural wax coating dries to a dull finish, and requires buffing to achieve a satisfactory gloss. In addition, because a coating of natural wax is mechanically weak, such a coating is very susceptible to scuffing and gives little or no protection against heel marks. Finally, a polished waxed coating is extremely slippery. It is a primary object of my invention to facilitate the preparation of a surface coating that is waxlike in its ability to reheal, and that can be buffed to a high gloss, but which resists scuffing, has good resistance to black heel marks on floors, and dries to a bright gloss without being buffed.

Numerous polymeric resin emulsions have been developed which form films having desirable properties of strength, brightness without buffing, and heel mark resistance, but which are removed only with such difficulty that their removal tends to be patchy. Over a period of time, with numerous applications of such coatings, the surface tends to become uneven and dirty. It would be highly desirable to produce a surface coating that was resistant to ordinary wear, but which could be readily removed by a hydrocarbon solvent. Since otherwise desirable resins do not dissolve well in hydrocarbon solvents, attempts have been made to produce film-forming compositions that were soluble in hydrocarbons by making the resins of very low molecular weight. In this manner, soluble compositions can be produced, but these, because of their low molecular weight, are in general so soft that they are not useful for floor polishing compositions and the like. A second object of my invention is to facilitate the preparation of a coating composition which is strong and durable, dries bright, but can readily be removed by hydrocarbon solvents.

My invention is based on the discovery that certain terpolymers of vinyl toluene, isobutyl or t-butyl methacrylate, and long chain alkyl methacrylates such as stearyl and lauryl methacrylate and the like, form hard, durable films that dry to a bright shine, but which are readily soluble in hydrocarbon solvents, and are wax-like in their healability. Polishing compositions including these polymers, together with hydrocarbon soluble film-forming resins and waxes, dry to films which are durable and scuff-resistant, and are resistant to black heel marking, but which are rebuffable and are readily removed by hydrocarbon solvents. An especially desirable feature of the coatings so formed is that in making a reapplication of the polishing composition, the underlying residue of the original film is cleaned by the solvent action of the hydrocarbon solvent in which the resin and wax materials are dissolved. The terpolymers of my invention are characterized by relatively high molecular weight, compared with other known polymers that have the same solubility in hydrocarbon solvents; typically, the molecular weight is in the range of 40,000 to 100,000, a range readily attained by conventional suspension polymerization techniques. The films formed from such polymers are characteristically harder and more durable than those formed from low molecular weight materials, but in contrast with other hydrocarbon-soluble resins of similar molecular weight, such as the copolymers of vinyl toluene and isobutyl methacrylate disclosed in the copending U.S application Ser. No. 392,942 by George L. Brown and Harry Silverstein for Copolymers of Vinyl Toluene and Isobutylmethacrylate, the polymers of my invention form films which are rehealable and buffable. Thus, the polymers of my invention offer dual advantages of drying to a bright shine without buffing, and yet being buffable to permit the restoration of a durable uniform surface gloss after scratching or abrasion has disfigured the surface originally formed upon drying.

By preparing terpolymers with varying proportions of the monomers, it has been found that from 10 percent to 20 percent of the stearyl methacrylate or lauryl methacrylate, by weight of total monomers, must be included to achieve the desired buffability and solubility in hydrocarbons. The percentage of vinyl toluene can be from about 20 to 90 percent by weight of total monomers, and the percentage of isobutylmethacrylate or t-butylmethacrylate can be from about 10 to 60 percent by weight of total monomers, although about 20 percent by weight of the latter is the preferred amount. A terpolymer of optimum properties with respect to buffability, solubility, resistance to heel marking and scuffing, and the ability to dry to a bright shine without buffing, comprises about 60 parts by weight of vinyl toluene monomer, 20 parts by weight of t-butyl or isobutylmethacrylate, and about 20 parts by weight of stearyl methacrylate. Lauryl methacrylate may be used in place of all or a part of the stearyl methacrylate, but in general I have found that stearyl methacrylate is preferable. I have tried using normal butyl methacrylate in place of the isobutyl or t-butyl methacrylates, but have found that the resulting terpolymers are much too soft for most purposes when an adequate amount of stearyl methacrylate to produce good solubility and buffability is included. In general, terpolymers made with t-butyl methacrylate tend to be more soluble in hydrocarbons, and to produce somewhat harder films, than those made with isobutylmethacrylate; thus, the former would be preferred where those qualities were especially desired.

The terpolymers of my invention may be prepared by conventional suspension polymerization techniques, in a manner known per se to those skilled in the art. To illustrate the preparation of such terpolymers, the following example is given:

To a 5 liter, 3-necked round bottom flask, fitted with a stirrer, condenser, and thermometer, is added 1500 cc. of deionized water, 15 grams of Acrysol A–1 (a conventional stabilizer as prepared by Rohm & Haas), and 1.5 grams of sodium sulfate. The stirrer is started and adjusted to about 400 r.p.m. A blend of 600 grams of vinyl toluene (the commercial blend of 60 percent meta vinyl toluene, and 40 percent para vinyl toluene), 200 grams of i-butyl methacrylate, 200 grams of stearyl methacrylate, 1.0 gram of dodecyl mercaptan, and 12.5 grams of benzoyl peroxide is added to the flask with stirring.

With stirring continued, the reaction is heated to 90° C., using a water bath, and held at that temperature with stirring until a condition is reached in which the soft "beads" have a specific gravity of about one. At this point, 5 more grams of Acrysol A–1 stabilizer is added, and the reaction continued at 90° C. with stirring until the copolymer beads become hard. At this point, the temperature is raised to 96° C. and the reaction finished off in one more hour at 96° C. to cure. The reaction product is cooled to 35° C., filtered, and the beads are washed with deionized water and dried. The product consists of fine, white, spherical beads in quantitative yield.

The following examples illustrate the effects of variations in the monomeric composition of the polymers of my invention on hardness and solubility in hydrocarbon solvents. One solvent used as Varsol No. 3, a highly aliphatic petroleum fraction having a flash point of about 100° F., typically a conventional aliphatic naphthenic hydrocarbon fraction containing about 10 percent by weight of aromatic hydrocarbons, as produced by the Humble Oil & Refining Company of Houston, Tex. Such a solvent is suitable for use in many applications, but may attack and damage some substrates such as vinyl, vinyl asbestos, and asphalt tile. Such substrates can be treated with Isopar G, a mixture of 100% isoparaffins, having a boiling point range of 315–350° F., and a flash point of 105° F. (TCC), as made by the Humble Oil & Refining Company, and the solubility of the terpolymers in that solvent is also shown. In Table I and the following tables in which solubility data is given, in general solubility is given as insoluble, fair, moderate and good, in a 20 percent solids solution in Varsol No. 3, and in a 10 percent solids solution is Isopar G. In some instances of difficult solubility, the cloud point is noted. As an indication of hardness, both the Knoop Hardness (determined on a Tukon Indentation Tester, in the manner described on page 135 of "Physical and Chemical Examination—Paints, Varnishes, Lacquers, Colors" by H. A. Gardner and G. G. Sward, twelfth edition, March 1962, published by Gardner Laboratory, Inc., P.O. Box 5728, Bethesda 14, Md.), and the Sward Hardness (determined with a Sward rocker, as described on pages 138 and 139 of the above book) are given. To indicate the molecular weight, solution viscosity of a 20 percent solids solution in Varsol No. 3 at 25° C. is given, in cps.

In the following tables, VT represents the commercial blend of isomers of vinyl toluene mentioned above, NBMA, IBMA and TBMA represent normal, iso and tertiary-butyl methacrylate, respectively, SMA and LMA represent stearyl and lauryl methacrylate, respectively, V represents viscosity, KH represents Knoop Hardness, SH represents Sward Hardness, SV represents solubility in Varsol No. 3, and SI represents solubility in Isopar G, all in the terms defined above.

A first series of terpolymers was made by the conventional process illustrated above from monomers consisting of vinyl toluene, i-butyl methacrylate, and stearyl methacrylate in the percentages by weight, based on total weight of monomers, given in Table I below. In this series, the weight ratio of vinyl toluene to i-butyl methacrylate was 60/40.

TABLE I

| Example | 1 | 2 | 3 | 4 | 5 |
|---|---|---|---|---|---|
| VT | 60 | 57 | 54 | 51 | 48 |
| IBMA | 40 | 38 | 36 | 34 | 32 |
| SMA | 0 | 5 | 10 | 15 | 20 |
| V | 24.1 | 25.4 | 24.2 | 22.9 | 23.2 |
| KH | 10.5 | 11.0 | 10.4 | 5.7 | 2.7 |
| SH | 45 | 46 | 42 | 40 | 32 |
| SV | (¹) | (¹) | (²) | (²) | (²) |
| SI | (³) | (³) | (³) | (⁴) | (⁵) |

¹ Moderate.
² Good.
³ Insoluble.
⁴ Insoluble at room temperature.
⁵ Cloud point, 13° C.

A second series of terpolymers was made in the manner described above, from monomers in the percentages by weight of total monomers given in Table II below, and were found to have the properties given in Table II. In this series of examples, the weight ratio of vinyl toluene to i-butyl methacrylate was 75/25.

TABLE II

| Example | 6 | 7 | 8 | 9 | 10 |
|---|---|---|---|---|---|
| VT | 75 | 71.25 | 67.5 | 63.75 | 60 |
| IBMA | 25 | 23.75 | 22.5 | 21.25 | 20 |
| SMA | 0 | 5 | 10 | 15 | 20 |
| V | 21.6 | 22.8 | 20.6 | 20.1 | 19.6 |
| KH | 13.4 | 11.3 | 10.1 | 7.8 | 5.1 |
| SH | 44 | 44 | 30 | 24 | 27 |
| SV | (¹) | (¹) | (¹) | (¹) | (¹) |
| SI | (²) | (²) | (²) | (³) | (⁴) |

¹ Good.
² Insoluble.
³ Insoluble at room temperature.
⁴ Cloud point, 16° C.

A third series of terpolymers, in which the weight ratio of vinyl toluene to isobutylmethacrylate was 90/10, was prepared and tested. The composition and properties of these terpolymers is given in Table III below, in the same terms as in the preceding tables.

TABLE III

| Example | 11 | 12 | 13 | 14 | 15 |
|---|---|---|---|---|---|
| VT | 90 | 85.5 | 18 | 76.5 | 72 |
| IBMA | 10 | 9.5 | 9 | 8.5 | 8 |
| SMA | 0 | 5 | 10 | 15 | 20 |
| V | 21.5 | 21.6 | 20.0 | 19.2 | 20.2 |
| KH | 14.7 | 12.0 | 11.0 | 8.2 | 5.6 |
| SH | 45 | 38 | 28 | 26 | 26 |
| SV | (¹) | (²) | (³) | (³) | (³) |
| SI | (⁴) | (⁴) | (⁴) | (⁵) | (⁵) |

¹ Fair.
² Moderate.
³ Good.
⁴ Insoluble.
⁵ Insoluble at room temperature.

Lauryl methacrylate was found to be almost, but not quite, as effective as stearyl methacrylate in promoting petroleum solubility and rehealability, while retaining film hardness, in the terpolymers of my invention. The slight degrees of difference are indicated in the following examples of terpolymers made and listed as described above. This series of examples can be compared directly with those of Table II above, as corresponding compositions were used except for the substitution of lauryl for stearyl methacrylate.

TABLE IV

| Example | 16 | 17 | 18 | 19 | 20 |
|---|---|---|---|---|---|
| VT | 75 | 71.25 | 67.5 | 63.75 | 60 |
| IBMA | 25 | 23.75 | 22.5 | 21.25 | 20 |
| LMA | 0 | 5 | 10 | 15 | 20 |
| V | 21.6 | 21.6 | 24.5 | 19.5 | 19.6 |
| KH | 13.4 | 11.3 | 9.3 | 8.2 | 4.6 |
| SV | (1) | (1) | (1) | (1) | (1) |

[1] Good.

Surprisingly, if n-butyl methacrylate is substituted for the i- or t-butyl methacrylates, the effect of either stearyl or lauryl methacrylate is to so lower the hardness of the resultant terpolymers that they are far below the useful range (a Knoop Hardness of 5 or more) needed for the formation of durable film. The terpolymers described in Tables V and VI below illustrate the rapid decrease in hardness with increasing amounts of long chain methacrylates in terpolymers otherwise the same as those described above. The terpolymers of Table V below can be compared directly with those of Table II above, and those of Table VI below can be compared directly with those of Table IV above.

TABLE VI

| Example | 21 | 22 | 23 | 24 | 25 |
|---|---|---|---|---|---|
| VT | 75 | 71.25 | 67.5 | 63.75 | 60 |
| NBMA | 25 | 23.75 | 22.5 | 21.25 | 20 |
| SMA | 0 | 5 | 10 | 15 | 20 |
| V | 19.8 | 20.9 | 20.5 | 18.6 | 17.8 |
| KH | 10.4 | 6.9 | 4.2 | 2.3 | 0.20 |
| SH | 37 | 36 | 42 | 42 | 42 |
| SV | (1) | (2) | (2) | (3) | (3) |
| SG | (4) | (4) | (4) | (5) | (5) |

[1] Fair.
[2] Moderate.
[3] Good.
[4] Insoluble.
[5] Insoluble at room temperature.

TABLE VI

| Example | 26 | 27 | 28 | 29 | 30 |
|---|---|---|---|---|---|
| VT | 75 | 71.25 | 67.5 | 63.75 | 60 |
| NBMA | 25 | 23.75 | 22.5 | 21.25 | 20 |
| LMA | 0 | 5 | 10 | 15 | 20 |
| V | 19.8 | 19.5 | 20.9 | 17.7 | 17.8 |
| KH | 10.4 | 6.8 | 3.0 | 1.4 | 0.15 |
| SV | (1) | (2) | (2) | (2) | (2) |

[1] Moderate.
[2] Good.

Examples of terpolymers made with t-butyl methacrylate are given in Table VII below. As will appear, these terpolymers are generally harder than those made with i-butyl methacrylate, and have such improved solubility in hydrocarbons that they are readily dissolved in Isopar G.

TABLE VII

| Example | 31 | 32 | 33 | 34 | 35 |
|---|---|---|---|---|---|
| VT | 60 | 50 | 40 | 30 | 20 |
| TBMA | 20 | 30 | 40 | 50 | 60 |
| SMA | 20 | 20 | 20 | 20 | 20 |
| V | 14.5 | 15.5 | 16.3 | 16.5 | 19.3 |
| KH | 11 | 12 | 12 | 14 | 13 |
| SV | (1) | (1) | (1) | (1) | (1) |
| SI [2] | (1) | (1) | (1) | (1) | (1) |

[1] Good.
[2] Solubilities determined on 20% solids in Isopar G.

To show the effect of varying amounts of stearyl methacrylate in VT, TBMA, SMA polymers on hardness and solubility, the following examples are cited in Table VIII. The ratio of VT/TBMA is held constant at 60/40.

TABLE VIII

| Example | 36 | 37 | 38 | 39 | 40 |
|---|---|---|---|---|---|
| VT | 60 | 57 | 54 | 51 | 48 |
| TBMA | 40 | 38 | 36 | 34 | 32 |
| SMA | | 5 | 10 | 15 | 20 |
| V | 9 | 12 | 14 | 8 | 12 |
| KH | 19.0 | 16.5 | 16.0 | 13.0 | 11.6 |
| SV | (1) | (1) | (1) | (1) | (1) |
| SI [2] | (3) | (3) | (4) | (1) | (1) |

[1] Good.
[2] Solubilities determined on 20% solids in Isopar G.
[3] Insoluble.
[4] Fair; cloud point at 10° C.

The terpolymers of my invention made from 10 to 20 percent by weight of lauryl or stearyl methacrylate, based on total weight of monomers, are soluble in hydrocarbons, adequately hard to produce durable films, and possess the desired wax-like quality of healability. Lower quantities of long chain alkyl methacrylates may lead to polymers of good solubility or hardness, but without the desired degree of healability. These properties are, in general, contributed to films formed from mixtures of the terpolymers of my invention with conventional constituents of polishing compositions, such as waxes, levelling agents, suspending agents, and the like. To illustrate a polishing composition especially adapted for use on furniture, the following composition was prepared, using a terpolymer prepared as described above:

Example 41

9.5 parts by weight of a terpolymer of 60 percent vinyl toluene, 20 percent t-butyl methacrylate, and 20 percent stearyl methacrylate, based on total weight of monomer, was intimately mixed with 0.5 part by weight of L-75 Organo Silicone, a surface active agent produced by Union Carbide, and 90.0 parts by weight of (VM & P) naphtha, to form a polishing composition. When applied to wooden furniture, and allowed to dry, a bright glossy coating was produced that evidenced durability and rehealability by standard test methods. Standard film draw downs are made on black test paper, and gloss is measured by a 60° gloss meter. The film is then scuffed and buffed with a clean cloth. Comparisons of scuffing and rehealability are made with standard commercial furniture polishes.

Example 42

A coating composition for snow equipment, such as skis and the like, was prepared by dissolving 5.0 parts by weight of a terpolymer made from 60 percent by weight of vinyl toluene, 20 percent by weight of i-butyl methacrylate, and 20 percent by weight of stearyl methacrylate, based on total weight of monomers. When applied to snow shovels, the film prevents the snow from sticking and it proved to be durable and somewhat of a protective coating.

The effectiveness of polishing compositions containing the terpolymers of my invention in producing hard and durable, yet rebuffable, films, in dependence on the amount of terpolymers in the formulation, is illustrated by the following examples 43, 44 and 45. In each example, the solid ingredients listed in Table IX below were dissolved in the solvent to produce a polishing solution. The amounts given are in percent by weight, based on the total weight of polishing solution. Each solution produced upon drying a bright, glossy, durable film, but the films differed in buffability in dependence on the amount of terpolymers in the manner indicated in the table. In these examples, the terpolymer was made from 60 percent by weight of vinyl toluene, 20 percent by weight of i-butyl methacrylate, and 20 percent by weight of stearyl methacrylate, based on total weight of monomers. The "copolymer" was made from 60 percent by weight of i-butyl methacrylate and 40 percent by weight of vinyl toluene.

TABLE IX

| | Example | | |
|---|---|---|---|
| | 43 | 44 | 45 |
| Buffability | Non-Buffable | Moderately Buffable | Buffable |
| Terpolymer | .5 | 2.0 | 9.0 |
| Copolymer | 7.0 | 5.5 | 0 |
| Pictex 120 | 2.0 | 1.0 | 0 |
| Myristic Acid | .5 | 1.5 | .5 |
| Hardwax EDM | 0 | 0 | .5 |
| Varsol No. 3 | 90.0 | 90.0 | 90.0 |

In Table IX, Pictex 120 is a general purpose mineral thinner soluble resin made by Pennsylvania Industrial Chemical Co. Schenectady BP-560, a general purpose mineral thinner soluble resin made by Schenectady Chemical, Durez 225, a general purpose mineral thinner soluble resin made by Hooker Chemical, or Shanco 320, a general purpose mineral thinner soluble resin made by Shanco Plastics and Chemicals, Inc., are similar well known materials that can be used for the same purpose in similar formulations. In making formulations of similar properties, lauric or palmitic acids can be used in place of myristic acid, and Hoechst wax V, a hard mineral thinned soluble wax made by American Hoechst Corp., can be used instead of Hardwax EDM, a hard mineral thinner soluble wax distributed by Dura Commodities, Inc.

The choice of petroleum solvent to be used depends on the particular requirements for a given formulation, in a manner that will be understood by those skilled in the art. In general, such well known solvents as Varsol No. 1, Amsco 46, Amsco 20, Skellysolve S-2, Solvosol 5, Shell 135, and Standard Thinner 350 can be used in place of Varsol No. 3. For applications requiring very low odor and toxicity, the solids compositions of Examples 41, 42 and 45 can be dissolved in Isopar G rather than Varsol No. 3. The former is definitely preferable as the solvent for the solids of Example 45, where the composition is to be used on resilient tiles of vinyl, vinyl asbestos, asphalt and the like, as Varsol No. 3 tends to attack such substrates.

While I have described my invention with respect to the details of various specific examples, many changes and variations will occur to those skilled in the art upon reading my description, and such can obviously be made without departing from the scope of my invention.

Having thus described my invention, what I claim is:

1. As a film forming agent, a hydrocarbon soluble terpolymer of monomers consisting of from 10 to 20 percent by weight of a member of the class consisting of lauryl and stearyl methacrylate, based on the total weight of monomers, and the balance vinyl toluene and a member of the class consisting of i-butyl and t-butyl methacrylate, in which the weight ratio of vinyl toluene to butyl methacrylate is from 3 to 2 to 9 to 1.

2. A film forming composition for producing upon drying a bright, glossy, hard, durable, rebuffable film, consisting of a solution in a hydrocarbon solvent of film forming agents comprising a major proportion of a terpolymer of vinyl toluene, a member of the class consisting of i-butyl and t-butyl methacrylate, and a member of the class consisting of lauryl and stearyl methacrylate.

3. As a film forming agent, a suspension terpolymer made from 60 percent by weight of vinyl toluene, 20 percent by weight of i-butyl methacrylate, and 20 percent by weight of stearyl methacrylate.

4. As a film forming agent, a suspension terpolymer made from 60 percent by weight of vinyl toluene, 20 percent by weight of t-butyl methacrylate, and 20 percent by weight of stearyl methacrylate.

5. A film forming composition consisting of spherical beads of a suspension terpolymer of monomers consisting of vinyl toluene, a member of the class consisting of i-butyl and t-butyl methacrylates, and a member of the class of long chain methacrylates consisting of stearyl and lauryl methacrylates, in which the weight ratio of vinyl toluene to butyl methacrylates is from three to two to nine to one and the amount of long chain methacrylates is sufficient to form a healable film upon deposition of the terpolymers from a petroleum solvent, the Knoop Hardness of the terpolymers being at least 5.

References Cited

UNITED STATES PATENTS

| | | | |
|---|---|---|---|
| 2,851,448 | 9/1958 | Slocombe et al. | 260—80.81 |
| 3,194,777 | 7/1965 | Christenson et al. | 260—33.6 |

MORRIS LIEBMAN, *Primary Examiner.*

L. T. JACOBS, *Assistant Examiner.*

UNITED STATES PATENT OFFICE
CERTIFICATE OF CORRECTION

Patent No. 3,378,513                           April 16, 1968

Daniel B. Witwer

It is certified that error appears in the above identified patent and that said Letters Patent are hereby corrected as shown below:

Column 4, TABLE III, fourth column, line 1 thereof, "18" should read -- 81 --. Column 5, TABLE VII, first column, line 7 thereof, "$SI^2$" should read -- $SI^1$ --; same column 5, TABLE VIII, first column, line 7 thereof, "$SI^2$" should read -- $SI^1$ --. Column 7, line 8, "thinned" should read -- thinner --.

Signed and sealed this 16th day of September 1969.

(SEAL)
Attest:

Edward M. Fletcher, Jr.                      WILLIAM E. SCHUYLER, JR.
Attesting Officer                                 Commissioner of Patents